United States Patent [19]
Yoshida et al.

[11] Patent Number: 5,689,739
[45] Date of Patent: Nov. 18, 1997

[54] LENS DRIVE MECHANISM FOR PHOTOGRAPHIC CAMERA WITH ZOOM LENS

[75] Inventors: Toshio Yoshida; Akio Omiya, both of Saitama-ken, Japan

[73] Assignee: Fuji Photo Optical Co., Ltd., Saitama-ken, Japan

[21] Appl. No.: 780,779

[22] Filed: Jan. 9, 1997

[30] Foreign Application Priority Data

Jan. 10, 1996 [JP] Japan ................................. 8-002182

[51] Int. Cl.⁶ ................................................ G03B 5/00
[52] U.S. Cl. ........................ 396/83; 359/700; 359/823
[58] Field of Search ................................ 396/79–83, 72; 359/700, 823

[56] References Cited

U.S. PATENT DOCUMENTS

| | | | |
|---|---|---|---|
| 5,113,261 | 5/1992 | Morisawa | 359/700 X |
| 5,140,468 | 8/1992 | Kayanuma | 359/700 X |
| 5,196,963 | 3/1993 | Sato et al. | 359/700 X |
| 5,223,873 | 6/1993 | Tsuboi | 396/82 |

FOREIGN PATENT DOCUMENTS 6-331877  12/1994  Japan.

*Primary Examiner*—W. B. Perkey
*Attorney, Agent, or Firm*—Sixbey, Friedman, Leedom & Ferguson, P.C.; Gerald J. Ferguson, Jr.

[57] ABSTRACT

A photographic camera is provided with a zoom lens having a front lens group which is moved back and forth in the direction of an optical axis held by a movable lens barrel and a rear lens group which is disposed behind the front lens group and is moved backed and forth in the direction of the optical axis maintaining a predetermined optical position relative to the front lens group in response to movement of the front lens group. A lens drive mechanism includes a cam lever which is supported on the camera body for rotation about a rotational axis perpendicular to the optical axis. A first cam pin is provided on the movable lens barrel and a first cam hole is provided in the cam lever. A second cam pin is formed integrally with the rear lens group and a second cam hole is provided in the cam lever. A predetermined play for permitting focusing of the zoom lens is formed between the first cam pin and the first cam hole in the direction of movement of the movable lens barrel.

5 Claims, 10 Drawing Sheets

LENS DRIVE MECHANISM FOR PHOTOGRAPHIC CAMERA WITH ZOOM LENS

BACKGROUND OF THE INVENTION

1. Field of the Invention

This invention relates to a lens drive mechanism for a photographic camera with zoom lens, and more particularly to such a lens drive mechanism in which zooming and focusing can be effected by the same actuator.

2. Description of the Related Art

There has been in wide use a photographic camera provided with a zoom lens whose focal length can be continuously changed between a maximum focal length (tele) and a minimum focal length (wide). Such a zoom lens generally comprises front and rear lens groups. When zooming the zoom lens, the front lens group is moved back and forth in the direction of the optical axis of the zoom lens while the rear lens group is moved backed and forth in the direction of the optical axis maintaining a predetermined optical position relative to the front lens group. When the shutter release button is half depressed after zooming, the zoom lens is focused on an object by a known automatic focusing mechanism.

As disclosed in Japanese Unexamined Patent Publication No. 6(1994)-331877, there has been known a lens drive system in which the front and rear lens groups are linearly moved by a zooming actuator when zooming the zoom lens and only the rear lens group is moved in the direction of the optical axis by a focusing actuator separate from the zooming actuator with the front lens fixed when focusing the zoom lens.

This lens drive system is disadvantageous in that since the separate actuators are used in zooming and focusing, separate drive sources and/or drive systems are necessary, which leads to increase in the overall size of the camera and adds to the manufacturing cost of the camera.

SUMMARY OF THE INVENTION

In view of the foregoing observations and description, the primary object of the present invention is to provide a lens drive mechanism for a photographic camera with zoom lens in which zooming and focusing can be effected by the same actuator.

In accordance with the present invention, there is provided a lens drive mechanism for a photographic camera provided with a zoom lens comprising a front lens group which is moved back and forth in the direction of an optical axis held by a movable lens barrel and a rear lens group which is disposed behind the front lens group and is moved backed and forth in the direction of the optical axis maintaining a predetermined optical position relative to the front lens group in response to movement of the front lens group. The lens drive mechanism of the present invention comprises a cam lever which is supported on the camera body for rotation about a rotational axis perpendicular to the optical axis, a first engagement mechanism provided on the cam lever for said movable lens barrel, and a second engagement mechanism provided on the cam lever for said rear lens group, and is characterized in that one of said first and second engagement mechanisms is adapted to engage with a predetermined play for permitting focusing of the zoom lens.

For example, said first engagement mechanism may comprise a first cam pin provided on said movable lens barrel and a first cam hole provided in said cam lever, and said predetermined play is formed between the first cam pin and the first cam hole in the direction of movement of the movable lens barrel.

Otherwise said second engagement mechanism may comprise a second cam pin formed integrally with said rear lens group and a second cam hole provided in said cam lever, and said predetermined play is formed between the second cam pin and the second cam hole in the direction of rotation of the cam lever.

The movable lens barrel may be moved back and forth in the direction of the optical axis by an electric motor, and said zoom lens is zoomed by rotation of the electric motor in one direction while the zoom lens is focused by rotation of the electric motor in the reverse direction after zooming.

Preferably the electric motor is disposed in the movable lens barrel.

In the lens drive mechanism of the present invention, when the movable lens barrel and the front lens group are moved back and forth, the cam lever is rotated through an engagement of the first engagement mechanism and the rear lens group is moved in the same direction as the front lens group through the engagement of the second engagement mechanism. whereby the zoom lens is zoomed.

The predetermined play in the first or second engagement mechanism is formed on one side after zooming. Accordingly, when the front lens group is moved in the direction reverse to the direction during zooming, the rear lens group is held stationary while the front lens group is moved by a distance equal to the width of the play, which permits focusing the zoom lens. Thus in accordance with the present invention, focusing and zooming can be effected by one actuator with a very simple structure.

For example, when said first engagement mechanism comprises a first cam pin provided on said movable lens barrel and a first cam hole provided in said cam lever and said predetermined play is formed between the first cam pin and the first cam hole in the direction of movement of the movable lens barrel, the play permits the front lens group to be reversed without moving the rear lens group after zooming. That is, until the movable lens barrel is moved by the distance of the play, the first cam pin is not engaged with the edge of the first cam hole and the cam lever is not rotated, whereby the rear lens group is kept stationary and the zoom lens is focused.

Similarly when said second engagement mechanism comprises a second cam pin formed integrally with said rear lens group and a second cam hole provided in said cam lever, and said predetermined play is formed between the second cam pin and the second cam hole in the direction of rotation of the cam lever, the play permits the front lens group to be reversed without moving the rear lens group after zooming. That is, until the cam lever is rotated by the distance of the play, the second cam pin is not engaged with the edge of the second cam hole and the second cam pin is not moved, whereby the rear lens group is kept stationary and the zoom lens is focused.

Further when an electric motor is employed as the actuator for moving the movable lens barrel, focusing can be effected by only reversing the motor after zooming, and as a result, control of the motor is facilitated.

Further when the motor is disposed in the movable lens barrel, the mechanism for moving the movable lens barrel can be simplified.

DESCRIPTION OF THE PREFERRED EMBODIMENT

Figure 1:
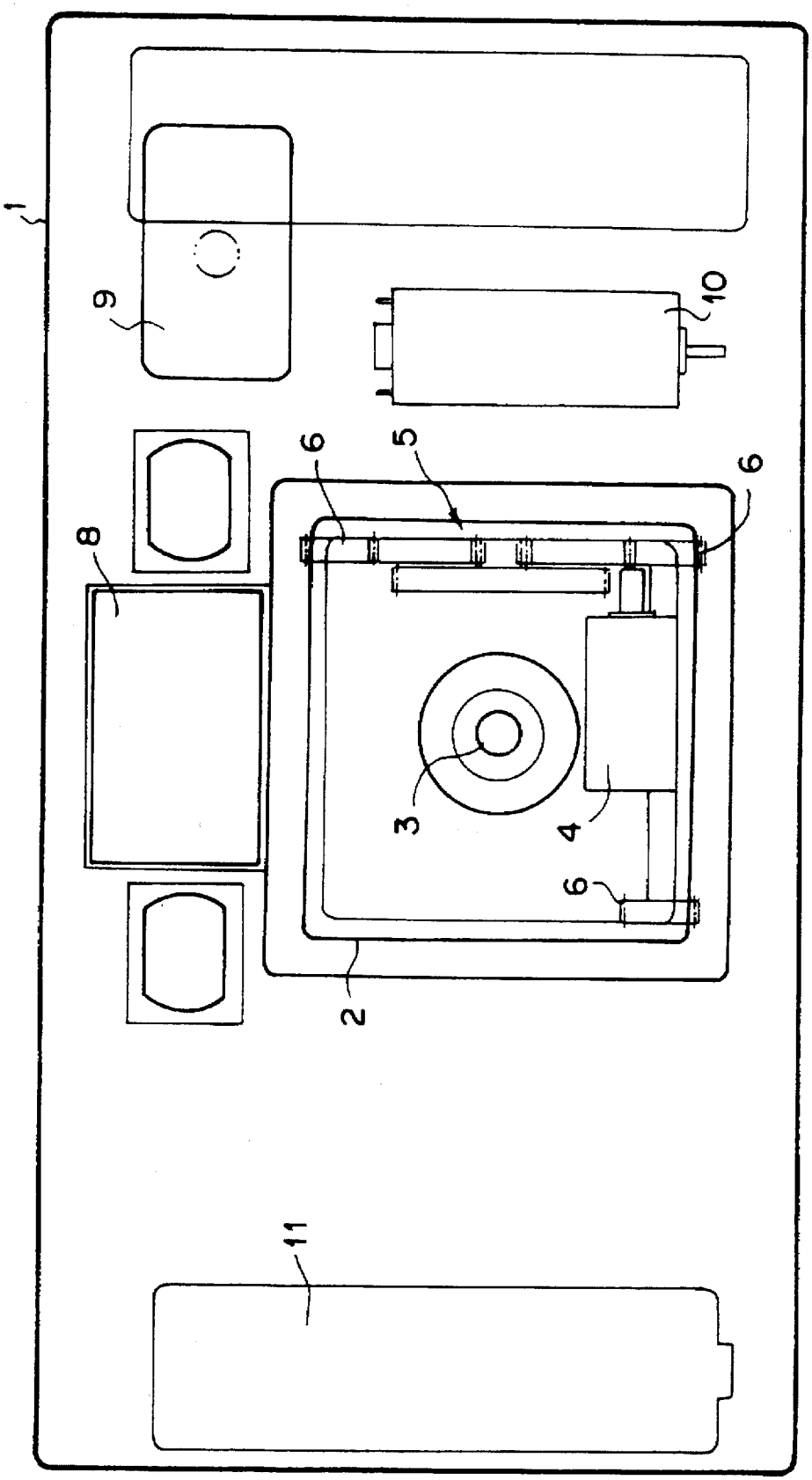
FIG. 1 is a schematic front view showing a photographic camera with zoom lens provided with a lens drive mechanism in accordance with an embodiment of the present invention.
Figure 2:
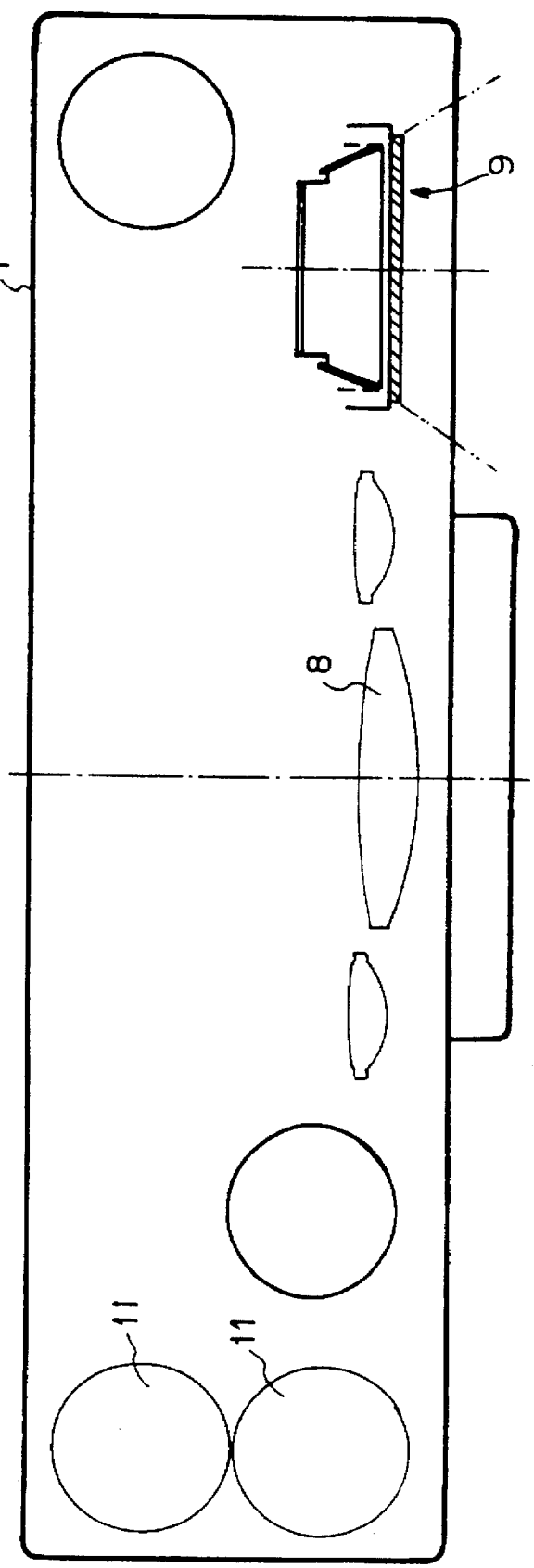
FIG. 2 is a schematic plan view of the camera.

In FIGS. 1 to 4, a photographic camera with zoom lens provided with a lens drive mechanism in accordance with an embodiment of the present invention comprises a camera body 1, a movable lens barrel 2 which is moved back and forth from the front face of the camera body 1 in the direction of the optical axis and a front lens group 3 fixed to the movable lens barrel 2.

A lens drive electric motor 4 is provided in the movable lens barrel 2 and the rotational force of the motor 4 is transmitted to a plurality of pinions 6 through a reduction gear mechanism 5 which are disposed in the movable lens barrel 2 and are in mesh with racks 7 formed in the camera body 1 to extend in the direction of the optical axis. Thus the movable lens barrel 2 is moved back and forth in the direction of the optical axis by the motor 4.

Figure 3:
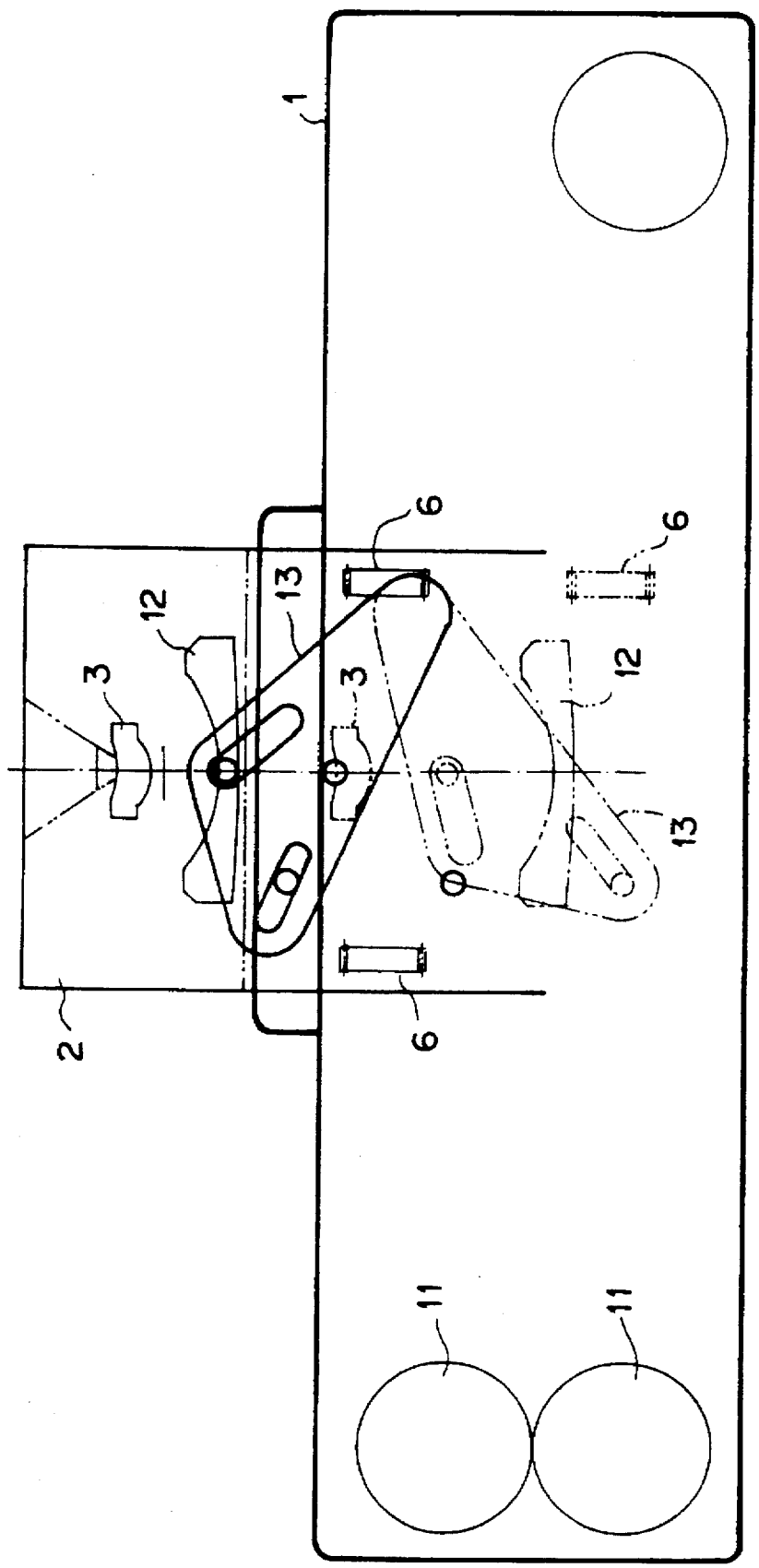
FIG. 3 is a schematic bottom view of the camera showing different positions of the movable lens barrel.
Figure 4:
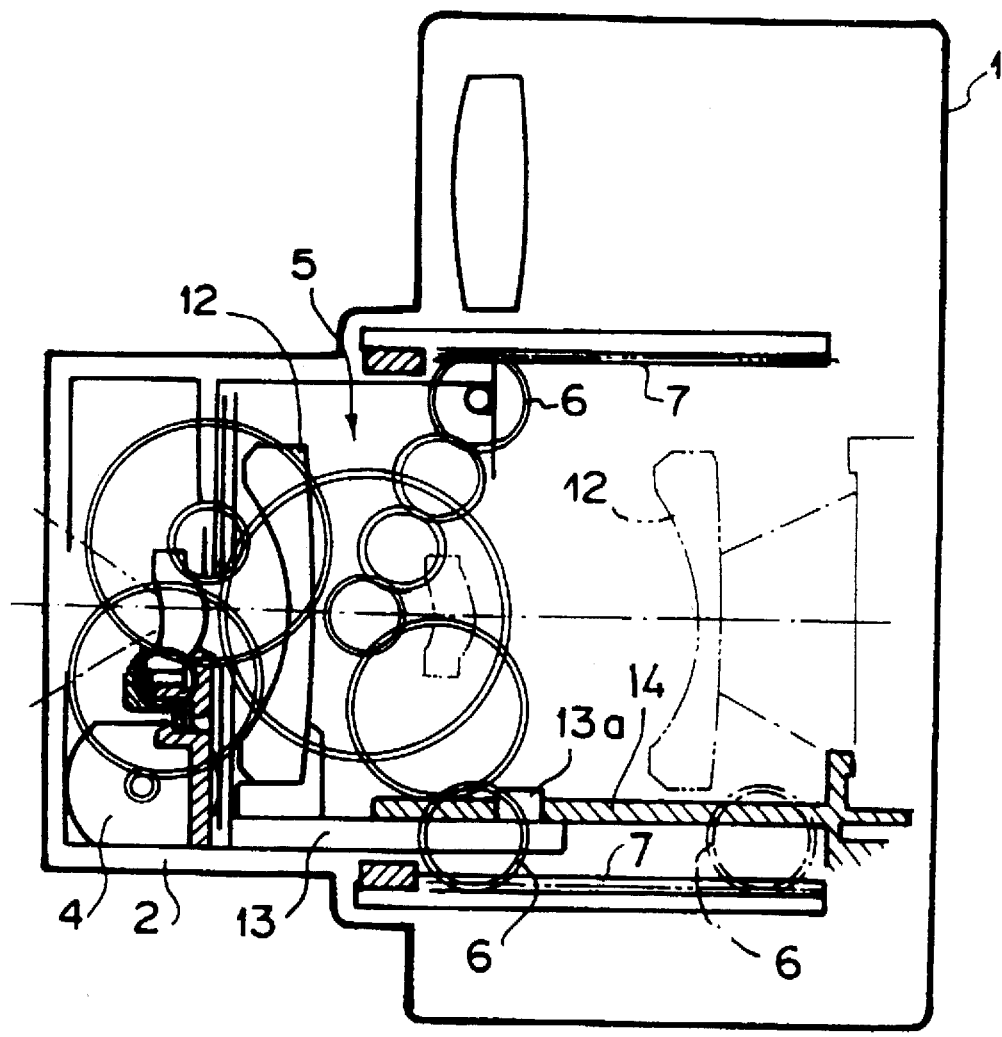
FIG. 4 is a schematic side view of the camera showing different positions of the movable lens barrel.

In FIGS. 3 and 4, a tele-position of the movable lens barrel 2 (in which the focal length of the zoom lens is maximized) where the movable lens barrel 2 is projected at the maximum from camera body 1 is shown by the solid line and a wide-position of the movable lens barrel 2 (in which the focal length of the zoom lens is minimized) where the movable lens barrel 2 is almost retracted into the camera body 1 is shown by the chained line. Reference numerals 8 to 11 respectively denote a viewfinder, a strobe light, a film winding motor and a battery.

A cam lever 13 for driving a rear lens group 12 has a pivot pin 13a at its base end portion and the pivot pin 13a is supported for rotation by a support member 14 fixed in the camera body 1 so that the cam lever 13 is rotatable around the pivot pin 13a in perpendicular to the optical axis.

Figure 5:
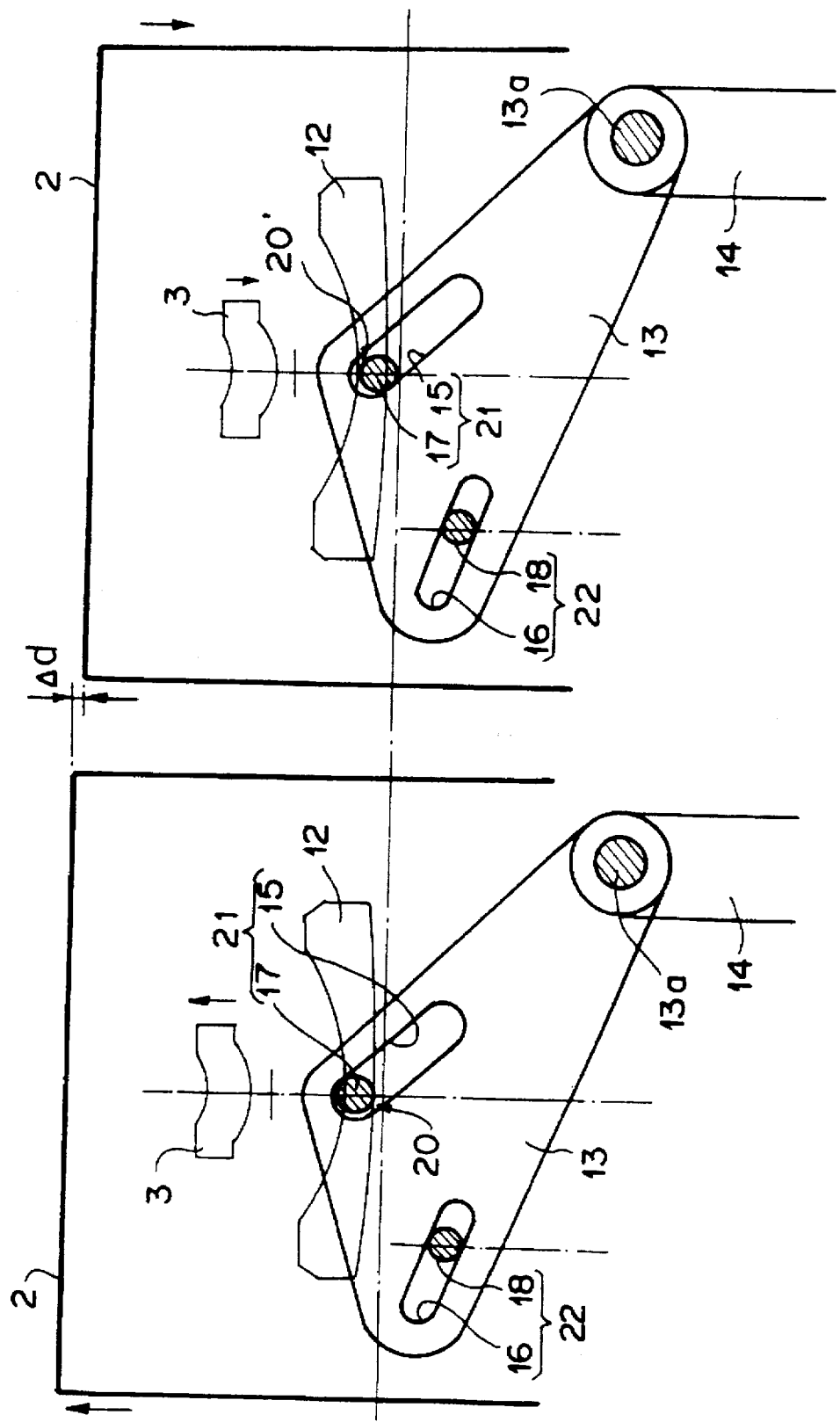
FIG. 5 is a schematic view for illustrating focusing in a tele-position.
Figure 6:
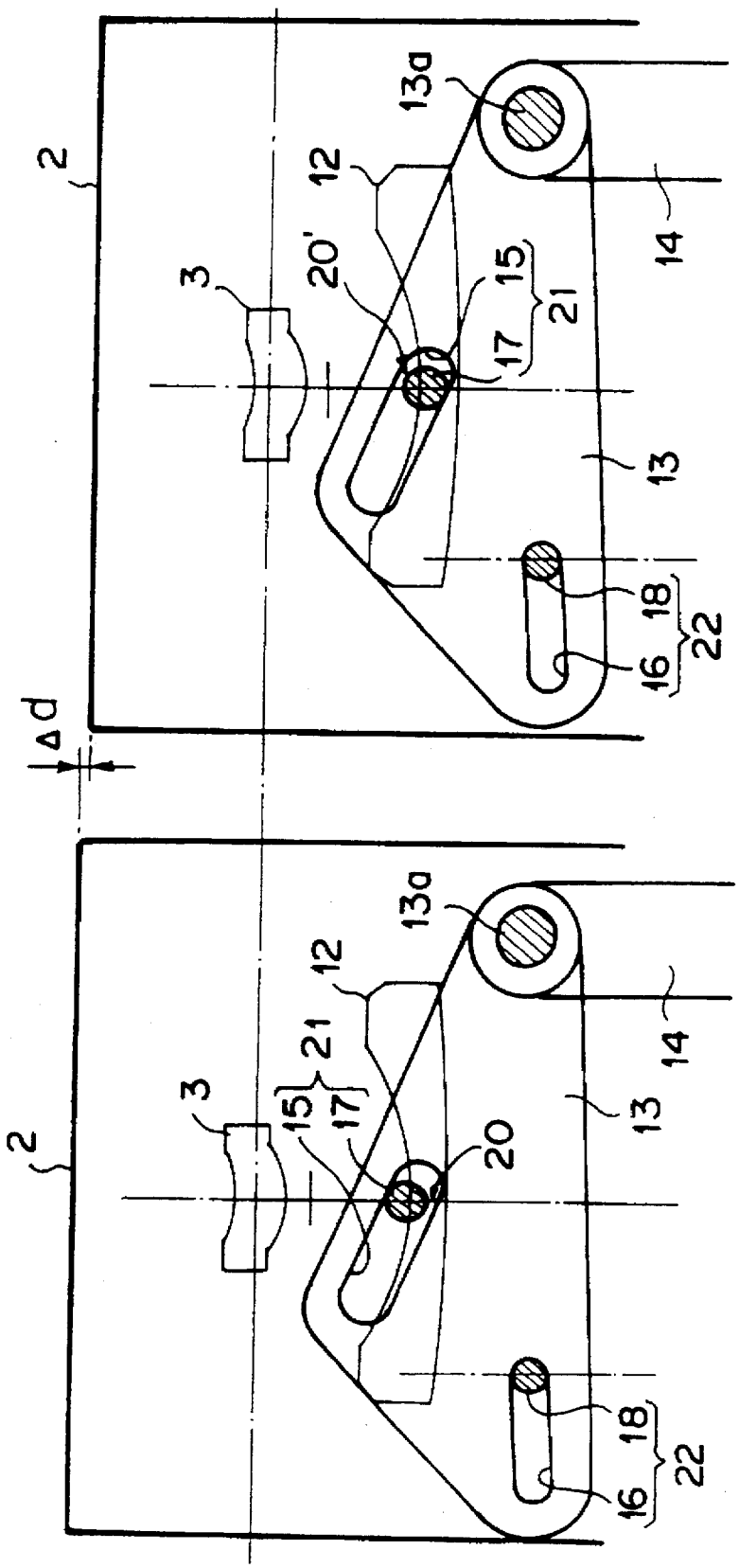
FIG. 6 is a schematic view for illustrating focusing in an intermediate position.
Figure 7:
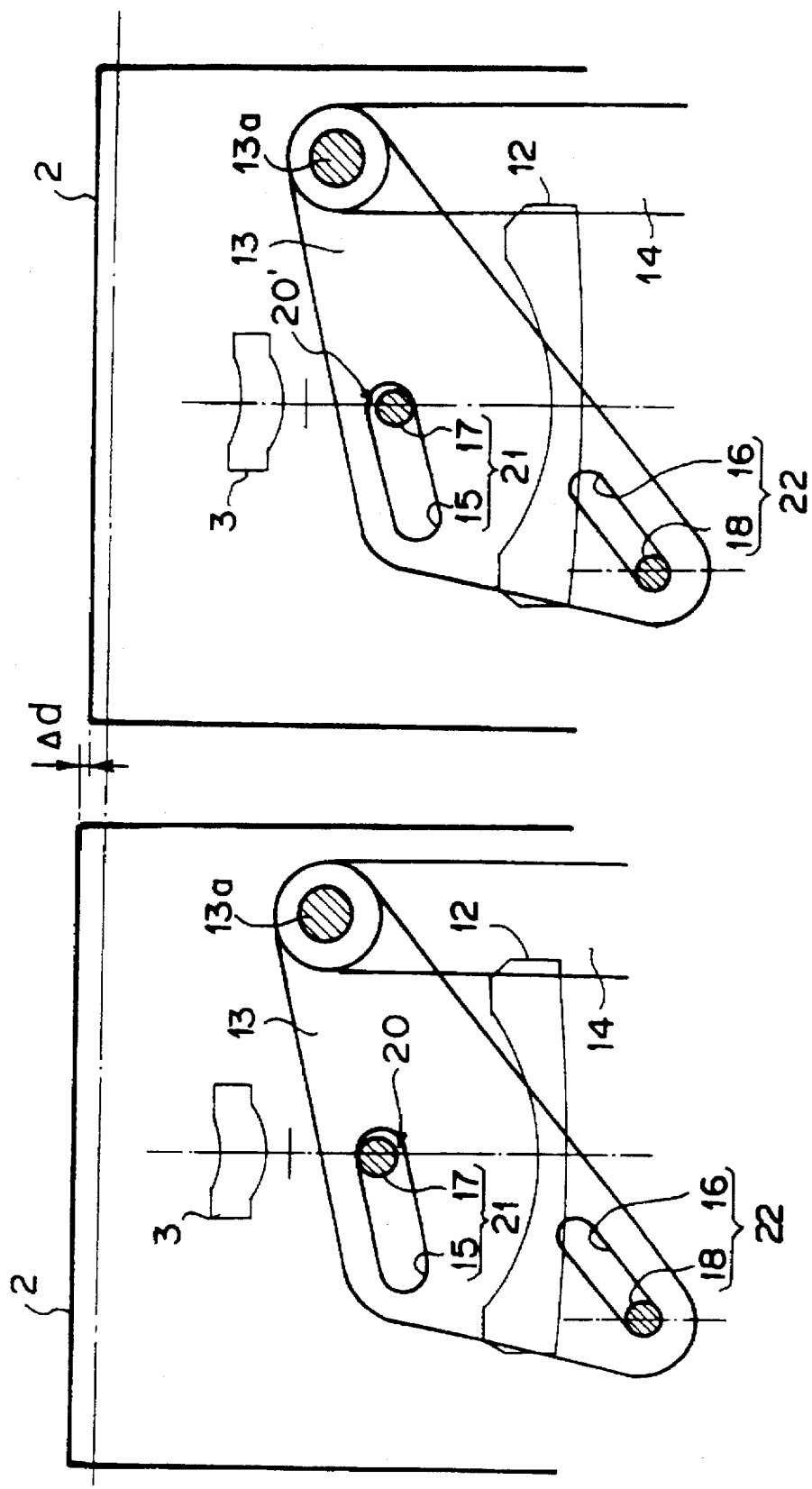
FIG. 7 is a schematic view for illustrating focusing in a wide-position.

As shown in FIGS. 5 to 7, the cam lever 13 is provided with a pair of elongated cam holes 15 and 16. The first cam hole 15 forms a first engagement mechanism 21 together with a first cam pin 17 which is stood on the movable lens barrel 2 to be moved in the direction of the optical axis along with the front lens group 3 and is inserted into the first cam hole 15 and the second cam hole 16 forms a second engagement mechanism 22 together with a second cam pin 18 which is fixed to the rear lens group 12 to be moved in the direction of the optical axis along with the rear lens group 12.

When the movable lens barrel 2 is driven in the direction of the optical axis together with the front lens group 3 by the motor 4, the cam lever 13 is rotated through the engagement between the first cam pin 17 and the first cam hole 15, whereby the rear lens group 12 is driven in the direction of the optical axis maintaining a predetermined optical position relative to the front lens group 3 through the engagement between the second cam pin 18 and the second cam hole 16 and the zoom lens is zoomed.

The second cam pin 18 and the second cam hole 16 are engaged with each other substantially without play therebetween in the direction of rotation of the cam lever 13. To the contrast, the first cam hole 15 is slightly wider than the diameter of the first cam pin 17 so that they are engaged with each other with a predetermined play therebetween in the direction of movement of the movable lens barrel 2.

The left side of FIG. 5 shows the state where the front lens group 3 has been moved to the tele-position (upward in FIG. 5) by the regular rotation of the motor 4. In this state, the first cam pin 17 is in abutment against the upper side edge of the first cam hole 15 with a play or clearance 20 of width Δd between the first cam pin 17 and the lower side edge of the first cam hole 15 in the direction of movement of the movable lens barrel 2. The zoom lens is in focus on a close position in this state.

In the state shown on the left side of FIG. 5, the motor 4 is reversed to slightly move the front lens group 3 downward (toward the wide-position) to focus the zoom lens. The play 20 of Δd permits the front lens group 3 (or the movable lens barrel 2) to be moved downward by a distance Δd without moving the rear lens group 12. That is, until the movable lens barrel 2 is moved by the distance Δd, the first cam pin 17 is not engaged with the lower side edge of the first cam hole 15 and the cam lever 13 is not rotated, whereby the rear lens group 12 is kept stationary and the zoom lens is focused.

The right side of FIG. 5 shows the state where the first cam pin 17 is in abutment against the lower side edge of the first cam hole 15. In this state, there is formed a clearance 20' of Δd between the first cam pin 17 and the upper side edge of the first cam hole 15 in the direction of movement of the movable lens barrel 2. The zoom lens is in focus on a far position. Accordingly, when the front lens group 3 is further moved toward the wide-position, the focal length of the zoom lens is shortened with the zoom lens kept in focus on a far position.

FIG. 6 shows the state where the front lens group 3 is in an intermediate position between the tele-position and the wide-position. The left side of FIG. 6 shows the state where the zoom lens is in focus on a close position and the right side shows the state where the zoom lens is in focus on a far point. FIG. 7 shows the state where the front lens group 3 is in the wide-position. The left side of FIG. 7 shows the state where the zoom lens is in focus on a close position and the right side shows the state where the zoom lens is in focus on a far position.

As can be seen from FIGS. 5 to 7, the first cam pin 17 slides along the first cam hole 15 as the cam lever 13 rotates. In this particular embodiment, the width of the first cam hole 15 is slightly enlarged toward the free end of the cam lever 13, whereby the value of Δd varies from the tele-position to the wide-position. The first and second cam holes 15 and 16 are not parallel to each other but at an angle to each other. This allows the rear lens group 12 to be moved back and forth in the direction of the optical axis maintaining a predetermined optical position relative to the front lens group 3.

In FIG. 7 showing the state where the front lens group 3 is in the wide-position, the first cam pin 17 is near the base end of the first cam hole 15 with the second cam pin 18 at the free end of the second cam hole 16. By extending the first cam hole 15 toward the base end of the cam lever 13 and extending the second cam hole 16 toward the free end of the cam lever 13, the movable lens barrel 2 can be further retracted into the camera body 1 to a bottom position.

When the width Δd of the play 20 or 20' is enlarged, the zoom lens can be focused with the first cam pin 17 not in contact with the first cam hole 15, whereby the zoom lens can be focused not only on a close position and a far position but can be linearly focused. However it is preferred in view of accuracy that the positions in which the first cam pin 17 is in contact with either side edge of the first cam hole be set as focused positions. With this arrangement, even if the movable lens barrel 2 is moved by a distance larger than Δd upon focusing, the zoom lens is kept in focus though the focal length slightly varies.

Though, in the embodiment described above, the cam pins 17 and 18 are formed on the movable lens barrel 2 and the rear lens group 12 with the cam holes 15 and 16 formed on the cam lever 13, the cam pins 17 and 18 may be formed on the cam lever 13 with the cam holes 15 and 16 formed on the movable lens barrel 2 and the rear lens group 12.

A lens drive mechanism in accordance with another embodiment of the present invention will be described with reference to FIGS. 8 to 10.

Figure 8:
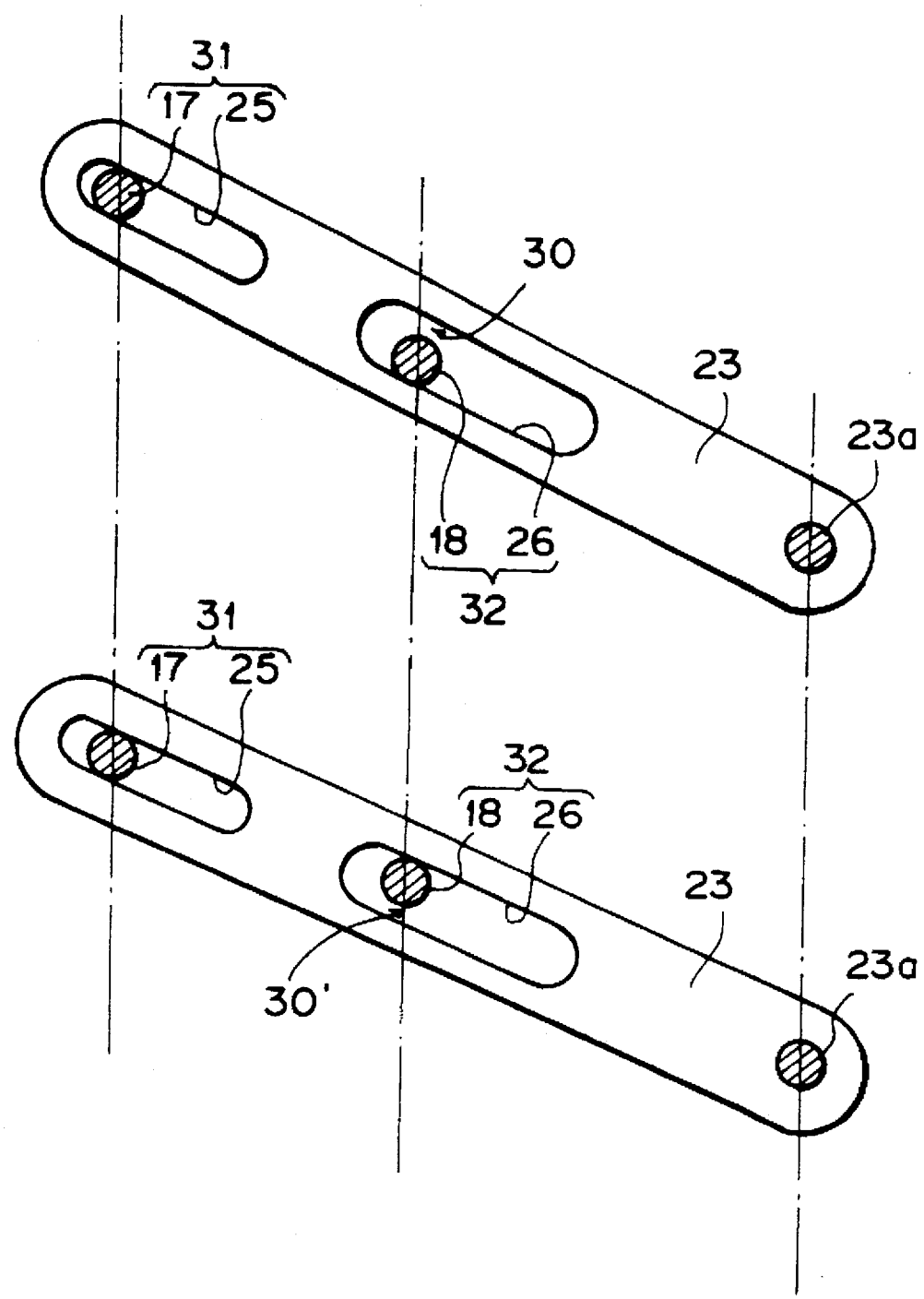
FIG. 8 is a schematic view for illustrating focusing in a tele-position in a lens drive mechanism in accordance with a second embodiment of the present invention.
Figure 9:
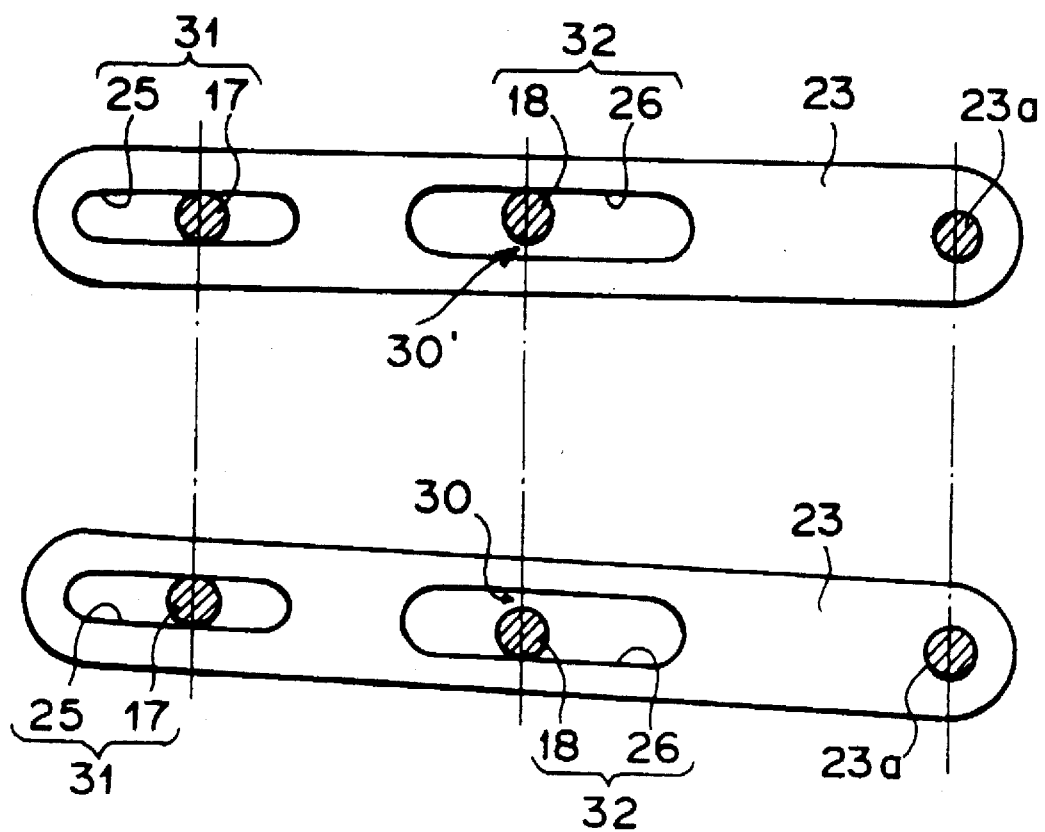
FIG. 9 is a schematic view for illustrating focusing in an intermediate position in the lens drive mechanism in accordance with the second embodiment of the present invention.
Figure 10:
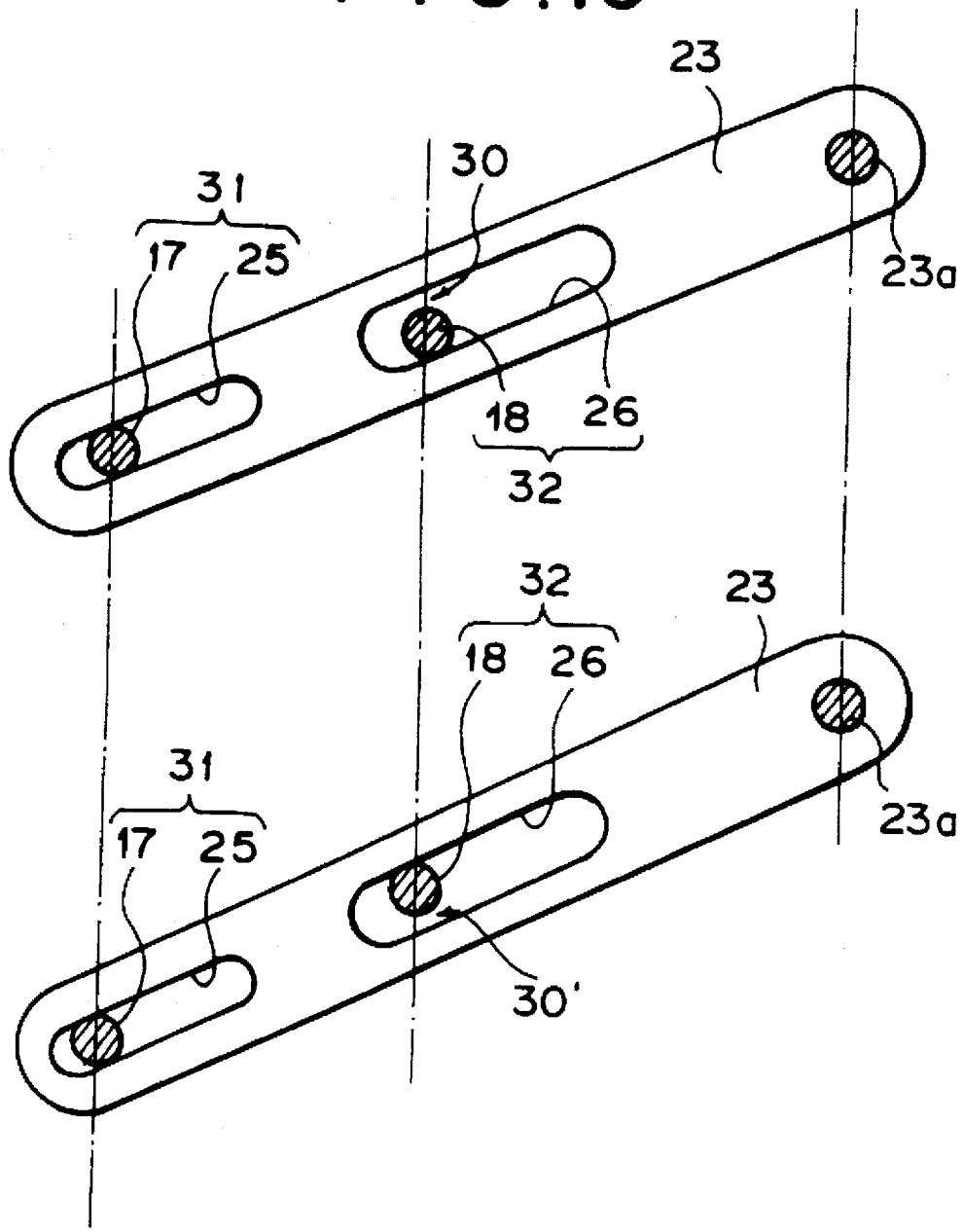
FIG. 10 is a schematic view for illustrating focusing in a wide-position in the lens drive mechanism in accordance with the second embodiment of the present invention.

As shown in FIGS. 8 to 10, the lens drive mechanism of this embodiment comprises an elongated cam lever 23 supported for rotation by a pivot pin 23a at its base end portion. The cam lever 23 is provided with a pair of elongated cam holes 25 and 26 arranged in the longitudinal direction thereof. The first cam hole 25 on the free end side forms a first engagement mechanism 31 together with a first cam pin 17 which is stood on the movable lens barrel 2 to be moved in the direction of the optical axis along with the front lens group 3 and is inserted into the first cam hole 25 and the second cam hole 26 on the base end side forms a second engagement mechanism 32 together with a second cam pin 18 which is fixed to the rear lens group 12 to be moved in the direction of the optical axis along with the rear lens group 12.

As in the preceding embodiment, when the movable lens barrel 2 is driven in the direction of the optical axis together with the front lens group 3 by the motor 4, the cam lever 23 is rotated through the engagement between the first cam pin 17 and the first cam hole 25, whereby the rear lens group 12 is driven in the direction of the optical axis maintaining a predetermined optical position relative to the front lens group 3 through the engagement between the second cam pin 18 and the second cam hole 26 and the zoom lens is zoomed.

In this embodiment the first cam pin 17 and the first cam hole 25 are engaged with each other substantially without play therebetween in the direction of movement of the movable lens barrel 2. To the contrast, the second cam hole 26 is slightly wider than the diameter of the second cam pin 18 so that they are engaged with each other with a predetermined play therebetween in the direction of rotation of the cam lever 23.

The upper side of FIG. 8 shows the state where the front lens group 3 has been moved to the tele-position (upward in FIG. 8) by the regular rotation of the motor 4. In this state, the second cam pin 18 is in abutment against the lower side edge of the second cam hole 26 with a play or clearance 30 of width Δd between the second cam pin 18 and the upper side edge of the second cam hole 26 in the direction of rotation of the cam lever 23 since the cam lever 23 is driven by the first cam pin 17. The zoom lens is in focus on a close position in this state.

In the state shown on the upper side of FIG. 8, the motor 4 is reversed to slightly move the front lens group 3 downward (toward the wide-position) to focus the zoom lens. The play 30 of Δd permits the front lens group 3 (or the movable lens barrel 2) to be moved downward by a distance Δd without moving the rear lens group 12. That is, until the cam lever 23 is rotated by the distance Δd, the second cam pin 18 is not engaged with the upper side edge of the second cam hole 26 and the second cam pin 18 is not moved, whereby the rear lens group 12 is kept stationary and the zoom lens is focused.

The lower side of FIG. 8 shows the state where the second cam pin 18 is in abutment against the upper side edge of the second cam hole 26. In this state, there is formed a clearance 30' of Δd between the second cam pin 18 and the lower side edge of the second cam hole 26 in the direction of rotation of the cam lever 23. The zoom lens is in focus on a far position.

FIG. 9 shows the state where the front lens group 3 is in an intermediate position between the tele-position and the wide-position. The upper side of FIG. 9 shows the state where the zoom lens has been moved from the tele-position to the intermediate position with the zoom lens kept in focus on a far position and the lower side shows the state where the zoom lens has been moved from the wide-position to the intermediate position with the zoom lens kept in focus on a close position. FIG. 10 shows the state where the front lens group 3 is in the wide-position. The upper side of FIG. 10 shows the state where the zoom lens has been moved from the bottom position to the wide position and is in focus on a close position and the upper side shows the state where the zoom lens has been moved from the intermediate position to the wide position with the zoom lens kept in focus on a far position.

In any case, by virtue of the play 30 or 30' formed between the second cam pin 18 and the second cam hole 26 in the direction of rotation of the cam lever 23, the zoom lens can be focused by reversing the motor.

What is claimed is:

1. In a photographic camera provided with a zoom lens comprising a front lens group which is moved back and forth in the direction of an optical axis held by a movable lens barrel and a rear lens group which is disposed behind the front lens group and is moved backed and forth in the direction of the optical axis maintaining a predetermined optical position relative to the front lens group in response to movement of the front lens group, a lens drive mechanism comprising a cam lever which is supported on the camera body for rotation about a rotational axis perpendicular to the optical axis, a first engagement mechanism provided on the cam lever for said movable lens barrel, and a second engagement mechanism provided on the cam lever for said rear lens group, one of said first and second engagement mechanisms being adapted to engage with a predetermined play for permitting focusing of the zoom lens.

2. A lens drive mechanism as defined in claim 1 in which said first engagement mechanism comprises a first cam pin provided on said movable lens barrel and a first cam hole provided in said cam lever, and said predetermined play is formed between the first cam pin and the first cam hole in the direction of movement of the movable lens barrel.

3. A lens drive mechanism as defined in claim 1 in which said second engagement mechanism comprises a second cam pin formed integrally with said rear lens group and a second cam hole provided in said cam lever, and said predetermined play is formed between the second cam pin and the second cam hole in the direction of rotation of the cam lever.

4. A lens drive mechanism as defined in any one of claims 1 to 3 in which said movable lens barrel is moved back and forth in the direction of the optical axis by an electric motor, and said zoom lens is zoomed by rotation of the electric motor in one direction while the zoom lens is focused by rotation of the electric motor in the reverse direction after zooming.

5. A lens drive mechanism as defined in claim 4 in which said electric motor is disposed in the movable lens barrel.

* * * * *